United States Patent [19]

Ruffell

[11] Patent Number: 5,526,194
[45] Date of Patent: Jun. 11, 1996

[54] STRUCTURE FOR HOLDING OPTICAL ACCESSORY ELEMENTS FOR A CAMERA LENS

[75] Inventor: Edward C. Ruffell, Amport, England

[73] Assignee: Panavision Europe Limited, Middlesex, England

[21] Appl. No.: 146,096

[22] PCT Filed: Apr. 24, 1992

[86] PCT No.: PCT/GB92/00762

§ 371 Date: Mar. 25, 1994

§ 102(e) Date: Mar. 25, 1994

[87] PCT Pub. No.: WO92/21053

PCT Pub. Date: Nov. 26, 1992

[30] Foreign Application Priority Data

May 10, 1991 [GB] United Kingdom ............... 9110156

[51] Int. Cl.⁶ ............................................. G02B 7/02
[52] U.S. Cl. .................. 359/827; 359/811; 359/819; 359/821
[58] Field of Search ............................. 354/295, 296; 359/819, 827, 821, 811

[56] References Cited

U.S. PATENT DOCUMENTS 4,383,735  5/1983  Stravitz ........................... 354/295
5,353,166  10/1994  Hanford ........................... 369/819

*Primary Examiner*—Georgia Y. Epps
*Assistant Examiner*—Ricky Mack
*Attorney, Agent, or Firm*—Hodgson, Russ, Andrews, Woods & Goodyear

[57] ABSTRACT

An optical element support for supporting optical elements adjacent to a lens of a camera. The support comprises an optical element holder assembly which is mountable to the camera lens housing. The holder assembly includes at least one stack of discrete holder members configured so that adjacent ones of the holder members together define grooves therebetween to hold a desired selection, by number and dimension, of optical elements. The holder members are removably connectable and further configured such that a rearrangement of the holder members in the stack permits variation in the number and/or width of the grooves and the accommodation in the grooves of optical elements of different number and/or thickness.

14 Claims, 3 Drawing Sheets

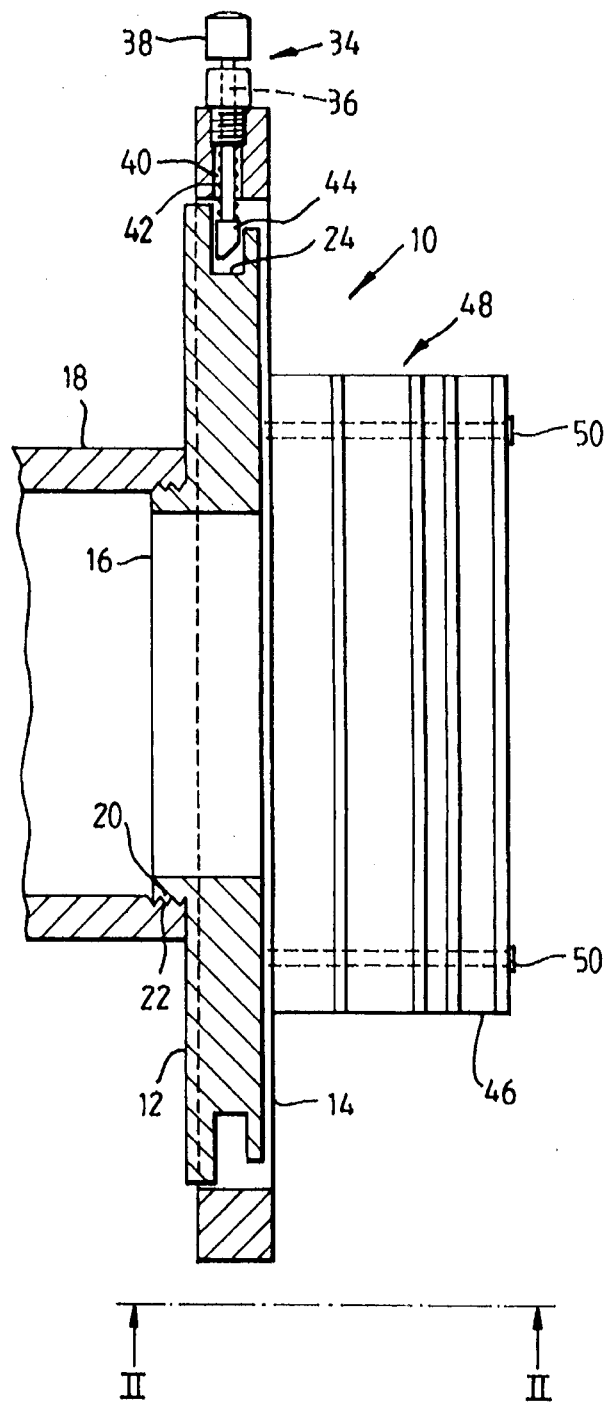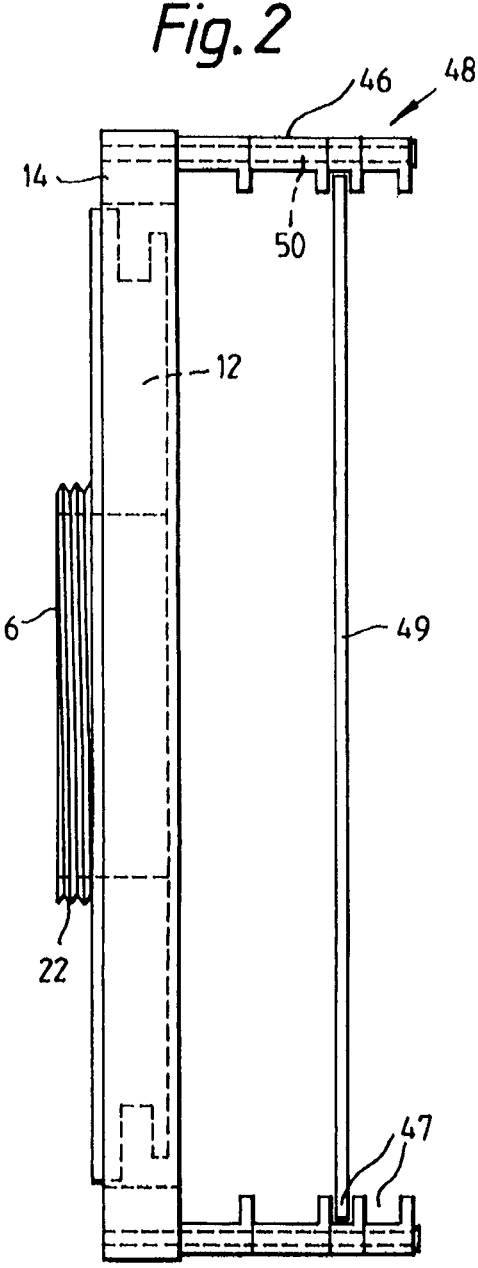

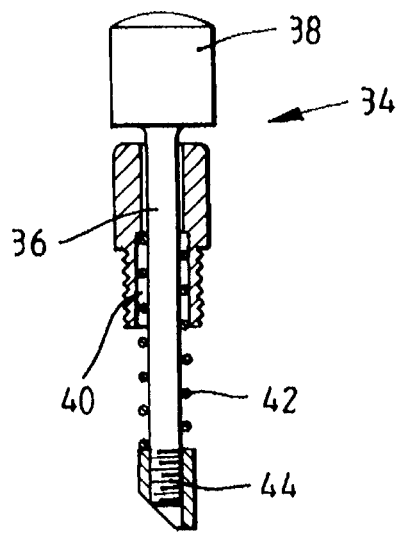
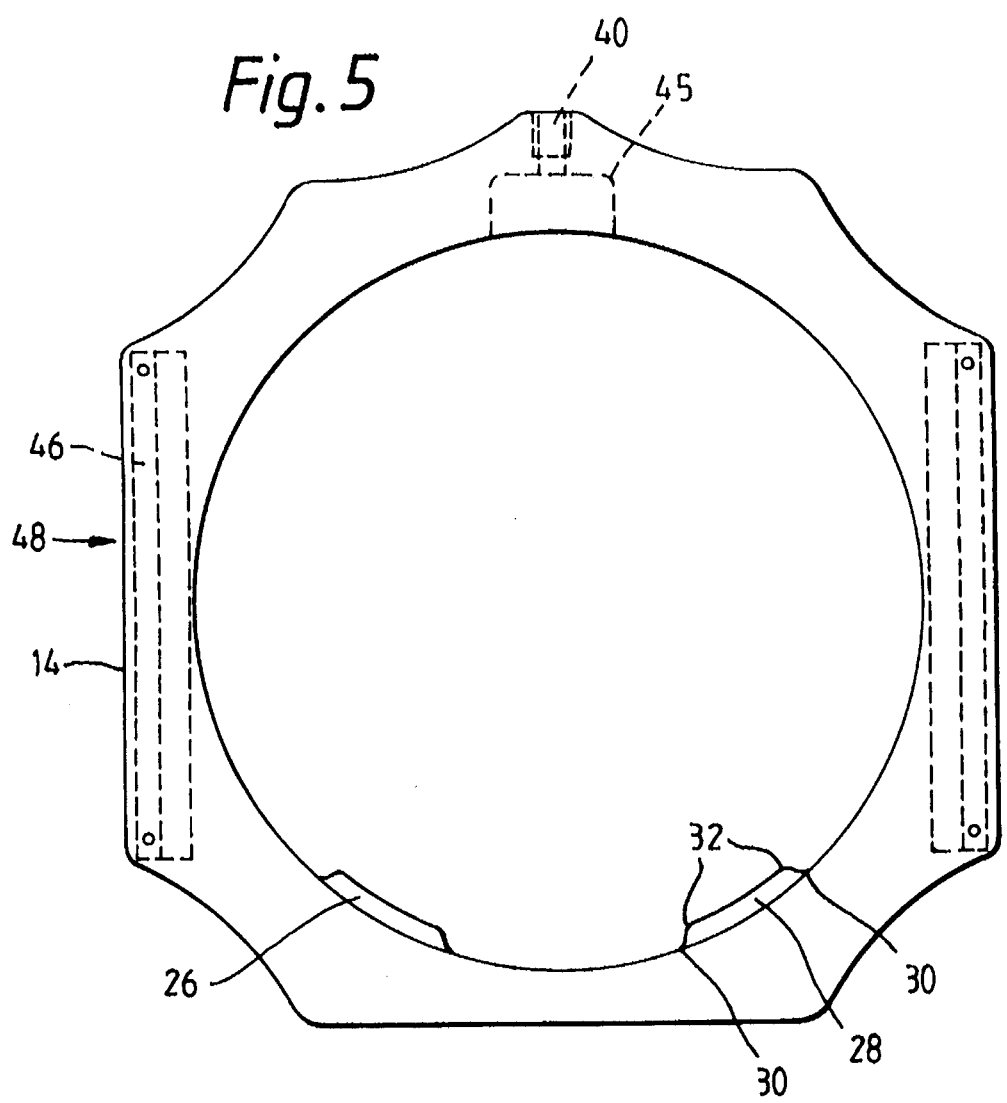

STRUCTURE FOR HOLDING OPTICAL ACCESSORY ELEMENTS FOR A CAMERA LENS

This invention relates to an optical element support particularly, but not exclusively, for supporting filters or other optical elements on a camera, such as a film camera.

It is known to locate optical elements in front of a camera lens on a support or "Matt Box" which is attached to the lens housing. The support includes a ring which has a screw thread adapted to fit the required camera lens. The ring snap fits onto a back plate of an optical element holder. The optical holder includes a number of grooves of fixed size and location into which an optical element may be mounted.

As the ring snap-fits onto the back plate of the holder it is difficult to rotate the ring relative to the holder. Also, the force required to remove the holder may place undesirable strain on the camera lens. Additionally, since the grooves are of fixed size and location, there is a limitation on the usefulness of the support.

It has been proposed to mount additional supports on the first support to increase the number of optical elements that can be mounted. This can be cumbersome, however, and there is still a limitation on the thickness of filter or other optical element that can be used.

Accordingly, one object of the present invention is to provide an improved support for optical elements.

According to one aspect of the present invention there is an optical element support attachable to a camera for supporting optical elements adjacent to a lens of the camera, the support comprising an optical element holder and an attachment means interlockable with the holder for attaching the holder to the camera, the holder including a stack of discrete holder members adapted to hold a desired selection, by number and dimension, of optical elements, the holder members being removably connected to the holder, such that a rearrangement of the stack of holder members permits the accomodation in the support of optical elements of different number or dimension.

Preferably the attachment means permits rotation of the holder relative to the camera and there are two opposing stacks of holder members, each optical element extending between corresponding holder members in the respective stacks.

Also preferably the holder members are 'L'-shaped, and the length of the base of the 'L'-shaped holder member is varied between the holder members depending on the required width of the optical element to be held.

Advantageously the attachment means includes a threaded portion which can be screwed on to the lens of the camera and more than one attachment means are provided, each one being adapted to fit a different sized lens.

Preferably the attachment means is interlockable with the holder by means of a latch releasable by the user.

Preferably the or each stack of holder members is connected to the holder by tension means extending through the stack.

Advantageously the or each stack of holder members is connected to the holder by screws extending through the stack.

Optionally a plurality of optical element holders may be coupled together by coupling means.

The invention also includes a kit of parts for an optical element support attachable to a camera for supporting optical elements adjacent to a lens of the camera, comprising one or more holder base plates, a plurality of attachment means each adapted to fit a different lens ring of a camera, the appropriate attachment means serving to attach the holder plate to the camera; and a plurality of discrete holder members adapted for mounting on the holder plate in at least one stack to hold a desired selection, by number and dimension, of optical elements, differing stacking arrangements of holder members on the holder plate serving to accommodate differing selections, by number and dimension, of optical elements.

Reference will now be made, by way of example, to the accompanying drawings in which:

FIG. 1 is a cross-section of an optical element support, attached to a lens housing, according to one aspect of the present invention;

FIG. 2 is a view thereof, removed from the lens housing, taken along line II II of FIG. 1;

FIG. 4 is a cross-section of a spring loaded engagement means as shown in FIGS. 1 and 3; and FIG. 5 is a plan view of part of a back plate of the support shown in FIGS. 1, 2, and 3.

Figure 3:
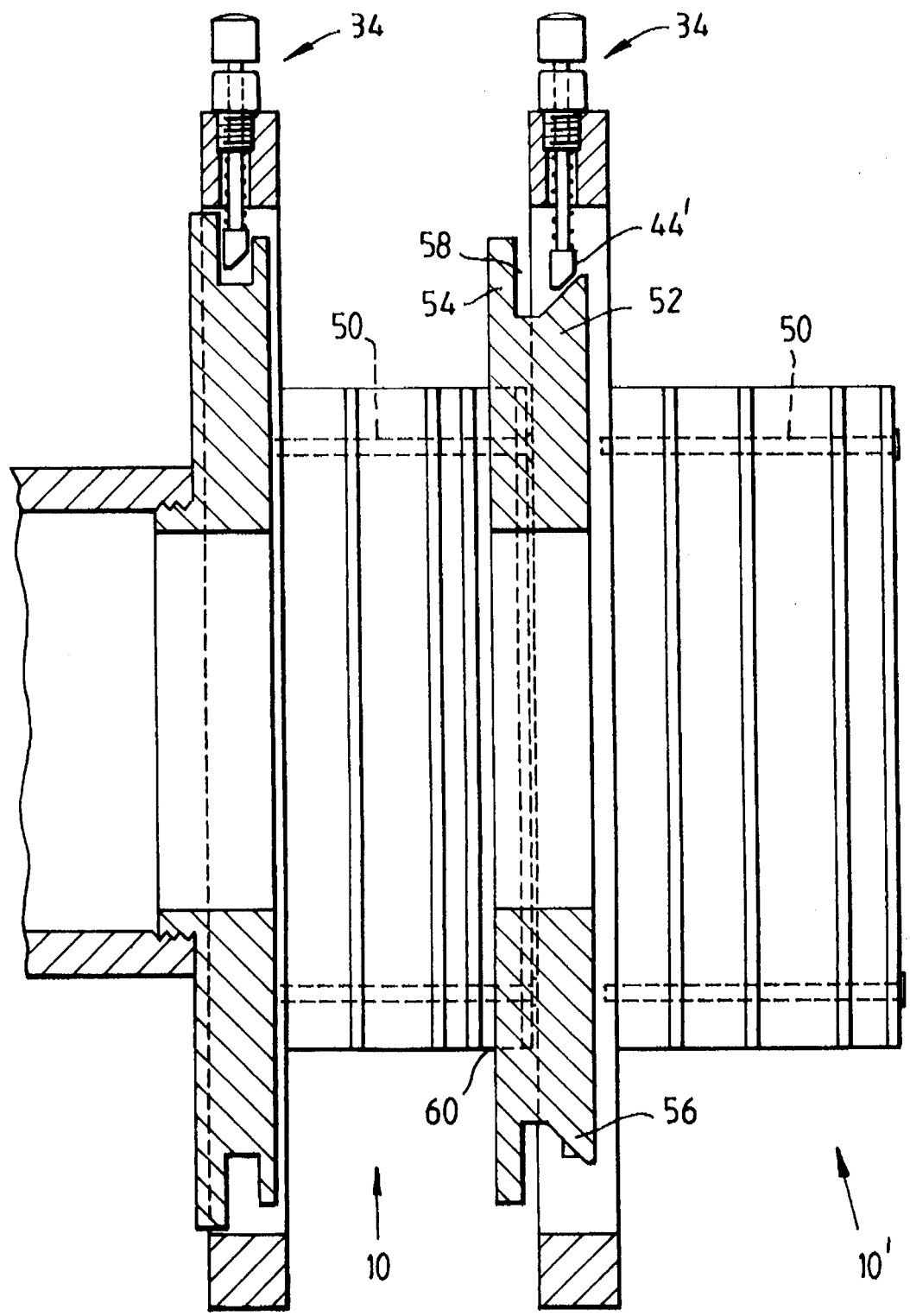
FIG. 3 is a cross-section of two optical element supports according to the present invention.

Referring to the figures, an optical element support is shown generally at 10. The support includes a mounting ring 12 and an optical element holder 14.

The ring has a circular aperture 16 which is approximately the same diameter as lens housing 18 to which the support is to be attached. The ring has an external threaded portion 20 which mates with an equivalent threaded portion 22 on the lens housing. The outer edge of the ring is not of constant diameter and includes an annular groove 24 which runs around the ring. The diameter of the outer edge farthest from the lens housing is slightly less than the diameter of the outer edge closest to the lens housing.

The holder is substantially circular in plan as is shown in FIG. 5. There are two inwardly directed fixed lugs 26 and 28 which are spaced apart around the holder and are separated by about 60°. Each lug has a two 2 radian curves 30 and two 1 radian curves 32. The holder also includes a spring loaded element 34 (shown only in FIGS. 1, 3 and 4). The spring loaded element comprises a pin 36 with a head 38. The pin is located in a hole 40 in the holder. A spring 42 is fixed to the top of the hole and extends down towards the end of the pin.

There is an engaging element 44 on which the bottom end of the spring rests. If the pin is moved in the direction of arrow A the spring is compressed and the element moves upwards until it is substantially located within the hole 40 and a recess 45 (shown in FIG. 5).

The ring may now be mounted on the holder, when the ring is located the pin head is released and element 44 moves into groove 24. The ring is then held in place, by the element and the two lugs. The ring can easily be rotated relative to the holder.

The holder also includes a plurality of 'L' shaped members 46 which are stacked one on top of the other on either side of the holder to form a stack 48. Respectively opposed members define a number of grooves or channels 47 into which an optical element 49 is seated. If the 'L'-shape members are suitably adapted to hold the optical element only one stack may be required. The 'L'-shaped members are held in their respective stacks against the holder, each stack held by means of two screws 50. It will be appreciated that the 'L'-shaped members can be attached to each other and the holder by any appropriate means, for example rivets, pop studs, etc. However, in accordance with the present invention, the holder members 46 are removably connected to the holder 14, such that, as evident from FIG. 2, a rearrangement of the holder members in the stack permits variation in the number and/or width of the grooves and the accommodation in the grooves of optical elements of different number and/or thickness. For different requirements different sized 'L'-shape members may be stacked together and the support will be provided with sufficient members for this purpose the difference in the members being that the base may be longer or shorter depending on the thickness of the optical element to be supported. It should be noted that the stack on one side of the holder should be symmetrical to the stack on the other side, if two stacks are used.

Referring particularly to the FIG. 3, it is possible to mount more than one such holder 14 onto the lens housing. A second holder 14' may be attached to the first holder 14. Attachment is made by means of a connecting member 52. The connecting member comprises a first and second ring-shaped parts 54, 56 defining between them an annular recess 58. The first part 54 of the connecting member is adapted to be located in the most extreme groove 60 of the first holder, whilst the second part 56 is attached to the second holder in a similar manner to that which the ring 12 is attached to the first holder 14. A second engaging element 44' locates in the annular recess 58 on action of a spring loaded element 34'. The second holder can rotate relative to the connecting ring and therefore also the first holder.

Successive supports may be attached together in a similar manner.

A plurality of rings 12 may be provided each with a different aperture 16, so that the support can be mounted on any required lens housing.

It will be appreciated that the relative shapes of the elements making up the support may be adapted and varied.

The optical elements (not shown) can be a filter, F-stop, lens, diffusion grating or plate or any other optical element that may be required.

I claim:

1. An optical element support for supporting optical elements adjacent to a lens of a camera, the support comprising an optical element holder assembly and means for mounting the holder assembly to a camera lens housing, the holder assembly including at least one stack of discrete holder members configured so that adjacent ones of the holder members together define grooves therebetween to hold a desired selection, by number and dimension, of optical elements, the holder members being removably connectable and further configured such that a rearrangement of the holder members in the stack permits variation in the number and/or width of the grooves and the accommodation in the grooves of optical elements of different number and/or thickness.

2. An optical element support according to claim 1, further comprising means for rotating the stack of holder members relative to the camera lens housing.

3. An optical element support according to claim 1, comprising two opposing ones of the stack, the stacks defining pairs of grooves wherein each groove in one of the stacks is coplanar with a corresponding groove in an other one of the stacks, so that each optical element extends between corresponding grooves in the respective stacks.

4. An optical element support according to claim 1, wherein each of the holder members is 'L'-shaped and has a base length which defines the overall width of a groove.

5. An optical element support according to claim 4, wherein the base lengths of the 'L'-shaped holder members are variable.

6. An optical element support according to claim 1, wherein the mounting means includes a threaded portion which can be screwed on to the lens housing of the camera.

7. An optical element support according to claim 1, including at least two of the mounting means, each of the mounting means being dimensioned to fit a different sized lens.

8. An optical element support according to claim 1, wherein the holder assembly includes a releasable latch to interlock with the mounting means.

9. An optical element support according to claim 1, comprising tensioners extending through the stack for connecting the stack of holder members.

10. An optical element support according to claim 1, comprising screws extending through the stack for connecting the stack of holder members.

11. An optical element support according to claim 1, comprising means for coupling together a plurality of the optical element holder assemblies.

12. An optical element support according to claim 1, further comprising means for detachably interlocking the mounting means and the holder assembly together.

13. A kit of parts for an optical element support for supporting optical elements adjacent to a lens of a camera, comprising at least one holder base plate, a plurality of mounting members each dimensioned to fit a different sized lens housing of a camera, the appropriate mounting member serving to attach the holder base plate to the camera, and a plurality of discrete holder members for assembling on the holder base plate in at least one stack, the holder members when assembled defining grooves between adjacent holder members to hold a desired selection, by number and dimension, of optical elements, the holder members being configured so that different stacking arrangements of holder members on the holder base plate define grooves of different widths to accommodate differing selections, by number and thickness, of optical elements.

14. A kit according to claim 13, comprising at least two of the holder base plate and means for connecting one of the holder base plates to the holder members of an other of the holder base plates.

* * * * *